Jan. 17, 1967   J. J. WINKLER   3,298,198
COUPLING WITH HYDRAULICALLY ACTUATED THRUST BUTTON
Filed Nov. 6, 1964
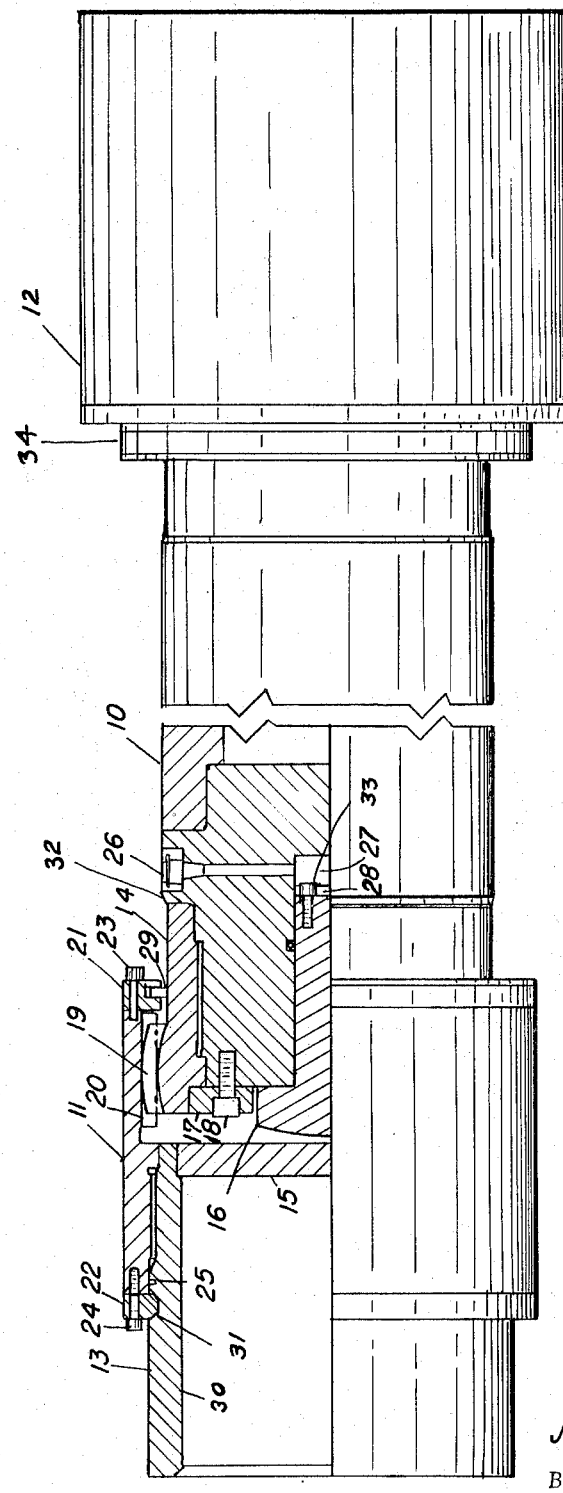
INVENTOR.
JOSEPH J. WINKLER
BY
Charles L. Lovercheck
attorney

United States Patent Office 3,298,198
Patented Jan. 17, 1967

3,298,198
COUPLING WITH HYDRAULICALLY ACTUATED THRUST BUTTON
Joseph J. Winkler, Erie, Pa., assignor to Zurn Industries, Inc., Erie, Pa., a corporation of Pennsylvania
Filed Nov. 6, 1964, Ser. No. 409,509
7 Claims. (Cl. 64—9)

This invention relates to a universal gear type coupling and in particular to a coupling adapted to be employed in conjunction with and for connecting together in driving relationship the rolls of a rolling mill and the drives associated therewith.

The usual type of couplings presently employed in rolling mill practice are not only difficult to assemble but there are further disadvantages inherent in such couplings even after they are assembled inasmuch as they are open and hence do not retain the lubricant therein nor do they prevent foreign material such as dirt and mill grime, etc., from entering the coupling. To avoid some of the foregoing disadvantages, it has been proposed to employ a flexible enclosure which is attached to the casing of the coupling and to the spindle proper.

When a roll is to be changed or removed from the mill employing a coupling with this type of enclosure, it is necessary to detach the enclosure and then slide out the roll with the roll end coupling half casing remaining on the end thereof. If, however, the roll end coupling half were not removed with the roll but, instead, were retained intact on the spindle, then the bore end of the coupling will drop downward and thereby cause the casing and spindle to be angularly misaligned. It then becomes necessary, when the end of the roll is to be re-inserted in the coupling casing, to raise the bore end of the coupling vertically in order to realign it with the roll. This operation is not only time consuming but is inconvenient and results in a very satisfactory condition.

Previous efforts have been made to solve the foregoing problems by utilizing a spring inside the coupling which urged the relatively moving parts out into alignment during the time that they were being changed. These springs exerted a force on the coupling at all times, were difficult to assemble since the spring had to be compressed, constant wear resulted because of the continued spring pressure and the coupling could not be easily manipulated manually during assembly.

It is, accordingly, an object of this invention to provide an improved coupling which incorporates novel means having an adjustable hydraulically actuated member therein for selectively exerting a force to hold the parts.

Another object is to provide a coupling for a rolling mill which is adapted to be relatively quickly connected and disconnected from the driving and driven elements of a mill and which is self-contained for retaining lubricant therein, either when connected or disconnected from the driven and driving elements.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 shows a partial cross sectional view of a coupling according to the invention.

Now with more particular reference to the drawing, the coupling disclosed is suitable to connect two heavy shafts. It may have crowned teeth similar to those shown in Patent No. 2,682,760. An adapter 13 is of a conventional type familiar to those skilled in the art. The sleeve 12 will have an internal bore which may be either keyed or non-circular to suit the particular member to which it is to be attached. The adapter 13 is generally cylindrical on its outer side has a bore 30 and has a peripheral groove 31 that receives the retainer ring 22. The retainer ring 22 is fixed to the end of the sleeve 11 by means of a bolt 24. The inner part of the retainer ring 22 is disposed in a groove 31 in the sleeve 13. The sleeve 13 has a counterbore on its inner end that receives the outer periphery of the thrust plate 15 which acts as an abutment for the rounded end of thrust button 16.

A hub 14 is splined to the member 32 and held thereon by the retainer ring 17 clamped by bolt 18. A central bore 27 is formed in the member 32 which forms a chamber for hydraulic fluid behind the thrust button 16. Hub 14 and member 32 make up a hub assembly. The thrust button 16 has a head with a rounded outer end. The thrust outerpart of the thrust button overlies the end of member 32. The thrust button has a body that slides in the bore 27. A sealing member 28 which may be a suitable ring is attached to the thrust button body and retained thereon by suitable means as by cap screws 33.

When fluid is injected through hydraulic plug 26 it flows through the channel to bore 27 and moves button 16 into engagement with the thrust plate 15, thereby forcing the sleeve 13 toward the left and bringing the ends of crowned teeth 19 into engagement with the retainer 21, thus holding the sleeve 13 in alignment with the hub 14.

The hub 14 is connected to the second hub 34 by by means of the tube shaft 10. These shafts and hubs may be welded together or keyed together in the usual manner, as well as splined together as illustrated.

During operation, when it is desirable to remove or replace a roll in the mill, it is merely necessary to adjust the hollow sleeve 13 to the angular relation relative to hub 14 that is desired and then inject hydraulic fluid under pressure through plug 26. This will urge the button 16 into engagement with the plate 15 which will force the hub outward and bring the retainer ring 21 into engagement with the ends of crowned teeth 19. This will hold the coupling in rigid position. When the assembly work has been completed, the hydraulic fluid may be released relieving all pressure between button 16 and plate 15 so that the coupling can float on the hub 14 in the usual manner. Thus, no continued pressure is imposed on the ends of the teeth.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling for joining together a pair of shafts in driving relationship comprising
   a first coupling member adapted to be operatively connected to one of said shafts,
   a second coupling member adapted to be connected to the other of said shafts and engaged in driving relationship with said first member,
   said members being movable in an axial direction relative to one another, pressure exerting means interposed between and adapted to force said members away from one another, an abutment of one of said members adapted to be engaged with the other of said members thereby to limit the relative movement between said members, said pressure means comprising a bore in said coupling adapted to receive hydraulic fluid under pressure, one said coupling member being in engagement with said fluid in said chamber, a source of hydraulic fluid connected to said chamber whereby said coupling members may be selectively forced into engagement with said abutment.

2. A coupling for joining together a pair of shafts in driving relationship comprising a first coupling member adapted to be operatively connected to one of said shafts, a second coupling member adapted to be connected to the other of said shafts and engaged in driving relationship with said first member, said members being movable in an axial direction relative to one another, hydraulic pressure exerting means adapted to be interposed between said members for urging them away from each other, and an abutment on one of said members adapted to be engaged with the other of said members thereby to limit the relative movement between said members, said hydraulic pressure means being adapted to exert a force of an order sufficient to maintain said members in an axially aligned relation when said coupling is disconnected from one of said shafts.

3. A toothed coupling comprising a hub and a sleeve, said sleeve being hollow and having internal inwardly extending teeth, means closing one end of said hollow sleeve and providing a stop, said hub having a part thereof disposed in said hollow of said sleeve, external crowned teeth on said hub intermeshed with said sleeve teeth, a bore in the center of said hub, a headed member having a body slidably received in said bore and a head attached to said body, said head having a rounded end adapted to engage said stop, limit means on said sleeve adapted to engage said hub teeth for limiting the movement of said hub teeth in a direction from said sleeve, and hydraulic pressure means in said hub adapted to engage said body for forcing said rounded end into engagement with said stop means whereby said external teeth are forced into engagement with said limit means and said sleeve is held in predetermined position relative to said hub.

4. The coupling recited in claim 3 wherein said means on said sleeve adapted to engage said hub teeth comprise a retainer ring attached to the end of said sleeve adjacent said hub, said retainer ring extending inwardly toward the center of said hub, said hub having a cylindrical surface adjacent said teeth, and sealing means on the inner periphery of said ring sealing engaging said cylindrical surface.

5. A coupling for joining together a first shaft and a second shaft in driving relationship comprising a first coupling member including a casing having a series of internal teeth formed on the inner surface and at a first end thereof and provided at the other end with a driving connection for engaging said first shaft, a second coupling member secured to said second shaft, said second coupling member having a series of external teeth formed on the outer periphery thereof adapted to be engaged with the teeth of said first coupling member, the teeth of said members being axially slidable relative to each other providing relative axial movement between said coupling members, stop means to limit the axial movement in one direction.

and hydraulic pressure fluid means adapted to be disposed and operably engageable with the other of said members for forcing said couplings to slide into engagement with said stop whereby said first coupling member is held in alignment with said second coupling member.

6. A coupling recited in claim 5 wherein said pressure means comprises a cavity in said first coupling member and a piston in said cavity slidable therein, said cavity being adapted to contain hydraulic fluid, said coupling being adapted to have means connected to it communicating with said cavity to force fluid into said cavity whereby said piston is forced toward said second member.

7. A coupling for joining together a pair of shafts in driving relationship comprising a sleeve having means at one end to receive the end of a shaft in driving relationship therewith, a plurality of internal gear teeth formed on the inner surface and adjacent to an end of said sleeve, a male coupling member having external teeth thereon, a head formed on said male member generally concentric therewith, said head having a rounded outer end, a plurality of gear teeth formed on the outer periphery of said male coupling member adapted to mesh with said internal teeth of said sleeve when said head is inserted in said sleeve in driving relationship, a stop ring secured to the end of said sleeve at an end of said internal teeth, said sleeve projecting inwardly and adapted to engage said external teeth, an axial bore means in said male coupling member, a body slidable in said bore, said body having a head, and a hydraulic fluid between, in engagement with, and adapted to force said head into engagement with means on said sleeve, said fluid adapted to exert a force of an order sufficient to maintain said sleeve and said head in an axially aligned relationship with the coupling is disconnected from one of said shafts.

References Cited by the Examiner
UNITED STATES PATENTS 2,845,781 10/1958 O'Brien _____ 64—9
2,959,258 11/1960 Hagemann.
2,968,936 1/1961 Croset _____ 64—7

FRED C. MATTERN, Jr., *Primary Examiner.*

HALL C. COE, *Examiner.*